United States Patent [19]

Jansen

[11] 4,233,890
[45] Nov. 18, 1980

[54] OUTDOOR BAR-B-Q SMOKER AND GRILL

[76] Inventor: Robert A. Jansen, 3930 Northern Pike, Monroeville, Pa. 15146

[21] Appl. No.: 57,621

[22] Filed: Jul. 16, 1979

[51] Int. Cl.³ .............................................. A47J 37/04
[52] U.S. Cl. ........................................ 99/340; 99/352; 99/443 R; 99/446; 99/448; 99/450; 99/480; 126/25 R; 126/276
[58] Field of Search ................. 99/340, 446, 448, 450, 99/467, 473, 480, 482, 352, 443 R; 126/25 R, 276

[56] References Cited

U.S. PATENT DOCUMENTS

| | | | |
|---|---|---|---|
| 2,626,559 | 1/1953 | Rau | 99/352 |
| 2,846,937 | 8/1958 | Jones | 99/352 |
| 2,851,941 | 9/1958 | Cogar | 99/340 X |
| 3,477,360 | 11/1969 | Raney | 99/446 X |
| 3,978,782 | 9/1976 | Werling | 99/446 |

FOREIGN PATENT DOCUMENTS 502388  5/1920 France ........................................ 99/473

*Primary Examiner*—Billy J. Wilhite
*Attorney, Agent, or Firm*—Thomas H. Murray

[57] ABSTRACT

A combination outdoor Bar-B-Q smoker and grill is provided wherein multiple levels of cooking racks on runners within an enclosure are capable of being positioned either directly over a charcoal heat source at one end of the enclosure or at the other end of the enclosure where they are not exposed to direct heat. The enclosure is provided with a slideable top which can be used as a work surface which can be closed or moved to an open position where it is supported in cantilever beam relationship.

7 Claims, 4 Drawing Figures

OUTDOOR BAR-B-Q SMOKER AND GRILL

BACKGROUND OF THE INVENTION

Most outdoor cooking devices presently available are of limited capacity, utility and purpose and are intended for fast cooking of meats over charcoal. On the other hand, it is a well-known fact that slow cooking of meat, fowl or fish at low temperatures minimizes shrinkage and maximizes tenderness and flavor. Smoking of these foods is also enhanced if the process is carried out slowly. While some outdoor cooking devices are advertised as being capable of use either as grills or smokers, their capabilities are limited. Even the largest and most expensive outdoor cooking devices available today are limited in capacity (i.e., are limited in cooking surface).

SUMMARY OF THE INVENTION

In accordance with the present invention, an outdoor multi-purpose Bar-B-Q smoker and grill is provided comprising a generally rectangular enclosure of sheet metal having multiple levels of racks or cooking surfaces disposed on runners and capable of sliding either directly over the charcoal heat source at one end of the enclosure or away from direct heat at the other end of the enclosure. Since the racks are slideable from one end of the enclosure to the other, they permit access to each of the lower racks for basting, turning or rearranging food being cooked.

Charcoal grids are disposed over an opening in the bottom of the enclosure. These grids consist of a pair of identical halves that can be either spread apart or be telescoped together to concentrate heat as desired. The grids are positioned over the aforesaid opening for use as a smoker or can be used for grilling by sliding one or more of the aforesaid racks directly over the grids. If the cooking device of the invention is to be used merely for conventional grilling, means are provided to move the grids up higher within the enclosure such that only the top rack is used when less cooking surface is required and more accessibility is desired.

Beneath the aforesaid opening in the bottom of the enclosure, and beneath the charcoal grids, is a housing which contains a removable ash drawer. This housing supports the enclosure at one end in conjunction with a relatively large diameter wheel at the forward end, thus providing a tripod-type support of agile mobility in close quarters or over rough patio blocks or ground. The enclosure includes means for directing all drippings from the cooking process into the aforesaid ash drawer for easy disposal along with the ashes themselves.

A flat sliding cover panel on top of the enclosure provides a convenient working and warming surface, whether closed or open. Notching and forming of the panel is such as to provide an interlock along the enclosure sides. When closed, the cover panel essentially seals off the enclosure. When slid open, the cover panel is supported in cantilever fashion and remains available as a work surface without the need of disturbing anything placed on it. Since the cover panel is infinitely adjustable, as in the ash drawer, a desired temperature can be maintained within the enclosure by opening each to varying positions to provide a draft to increase or decrease temperature as desired.

The above and other objects and features of the invention will become apparent from the following detailed description taken in connection with the accompanying drawings which form a part of this specification, and in which.

Figure 1:
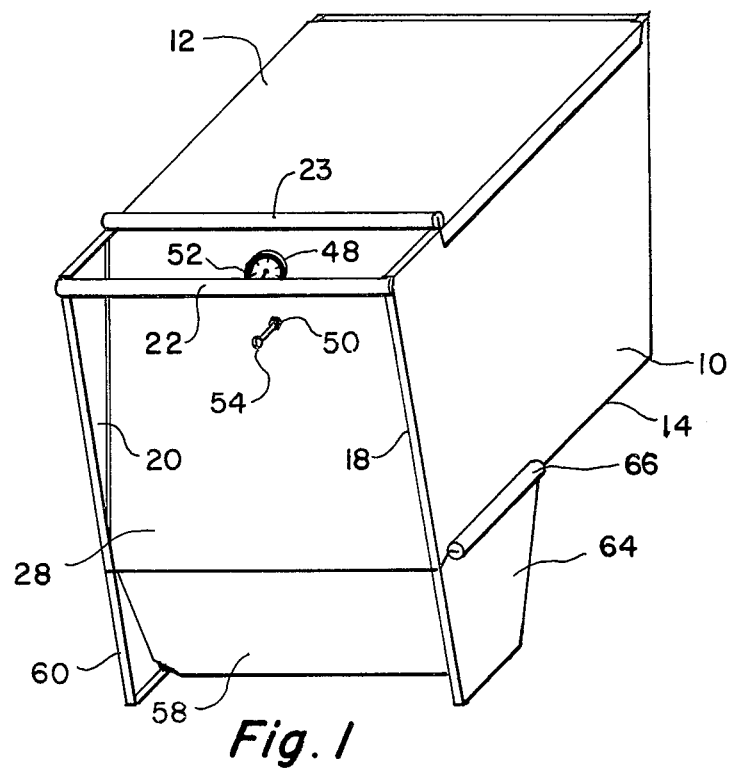
FIG. 1 is a perspective view of the cooking device of the invention as viewed from the back thereof.
Figure 2:
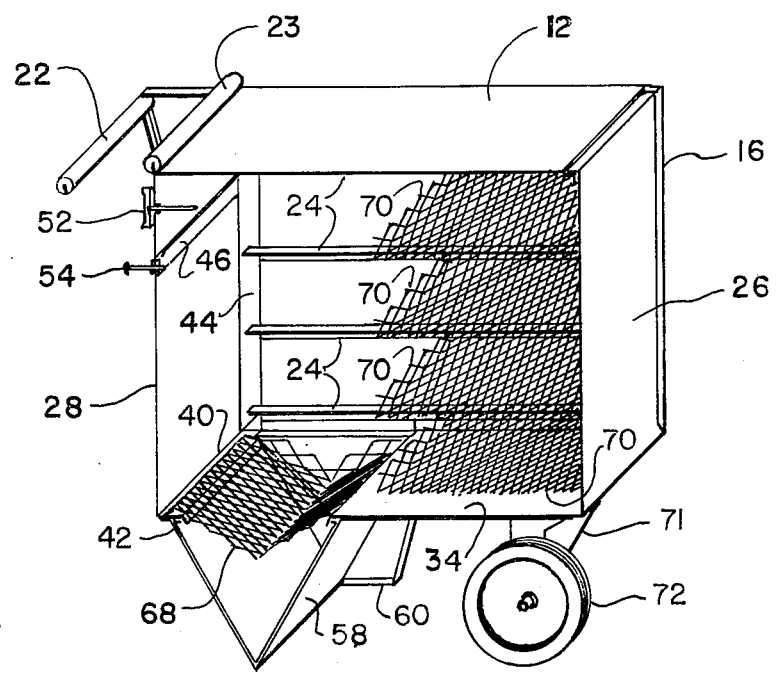
FIG. 2 is a perspective cross-sectional view of the invention cut away through the center from front to rear to illustrate the various components within the cooking device in their normal closed position as used during a smoking process.
Figure 3:
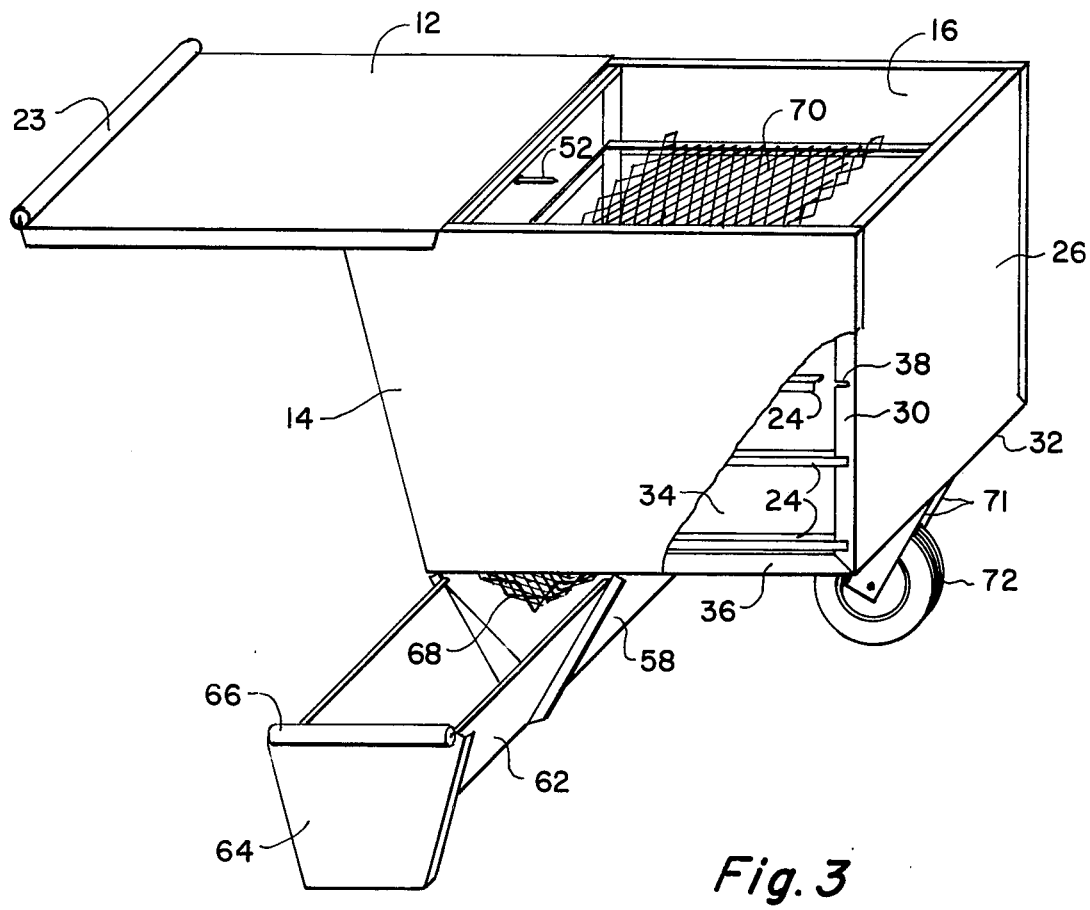
FIG. 3 is a perspective side view of the invention illustrating the cover and ash drawer completely open and showing one of many arrangements available for the racks and grids.

With reference now to the drawings, and particularly to FIGS. 1 and 2, the cooking device shown includes an enclosure 10 formed of sheet metal and having an upper sliding cover or panel 12 which can slide from the closed position shown in FIGS. 1 and 2, for example, to the open position shown in FIG. 3. The enclosure 10 is formed from side panels 14 and 16 provided with angularly-shaped extensions 18 and 20 which serve to mount a cabinet handle 22 away from the heat within the enclosure 10. Handle 23 on the upper cover 12 can slide over handle 22. The side panels 14 and 16 have hemmed flanges extending along their top edges which serve as a track or guide for the sliding cover panel 12 which is supported in cantilever fashion when it is open as shown in FIG. 3. The side panels 14 and 16 each supports and retains four rack support angles or guideways 24. As shown in FIG. 3, the front panel 26 is provided with right-angle flanges 30 and is formed from sheet metal bent along seam 32 to provide a lower panel 34, also having upstanding flanges 36 at its two opposite edges. Formed in the flanges 30 are notches 38 which receive the angles 24 such that when the side panel 14, for example, is riveted to the flanges 30 and 36, the angles 24 are held in place within the slots 38.

The rear panel 28 (FIG. 2) is also bent along seam 40 to provide a lower floor portion 42. At the edges of the rear panel 28 are angles 44 which support a cross angle 46. Two openings 48 and 50 (FIG. 1) are provided in the rear panel 28. One of these is adapted to receive a thermometer 52 and the other receives a pin 54 which extends into the angle 46 which serves to support cooking utensils or unneeded cooking racks.

The bottom panels 34 and 42 do not extend over the entire length of the enclosure 10 but rather have separated ends which provide an opening 56 (FIG. 4) beneath which is a V-shaped bottom support housing 58 bounded on one end by an end panel 60 which also forms a support leg for the cooking device of the invention. Slideable into the V-shaped bottom support housing is a V-shaped ash drawer 62 (FIG. 3) provided at its end opposite the fixed end panel 60 with a second end panel 64. The end panel 64 is equipped with a handle 66 such that the drawer may be pulled out into the position shown in FIG. 3. Positioned over the opening 56 in the bottom of the enclosure 10 and, hence, over the ash drawer 62, are V-shaped charcoal grids 68. Supported on the angles 24 at opposite sides of the enclosure 10 are four sliding cooking racks 70 on which food to be cooked is positioned. Beneath the forward portion of the enclosure 10 is an axle assembly or support 71 which carries a forward wheel 72. The wheel 72, in combination with the end panel 60 and bottom housing 58, provides a tripod arrangement for supporting the enclosure 10 and its contents. The enclosure may be moved over the ground surface by lifting the end panel 60 and housing 58 off the ground surface and pushing the enclosure with handle 22.

Figure 4:
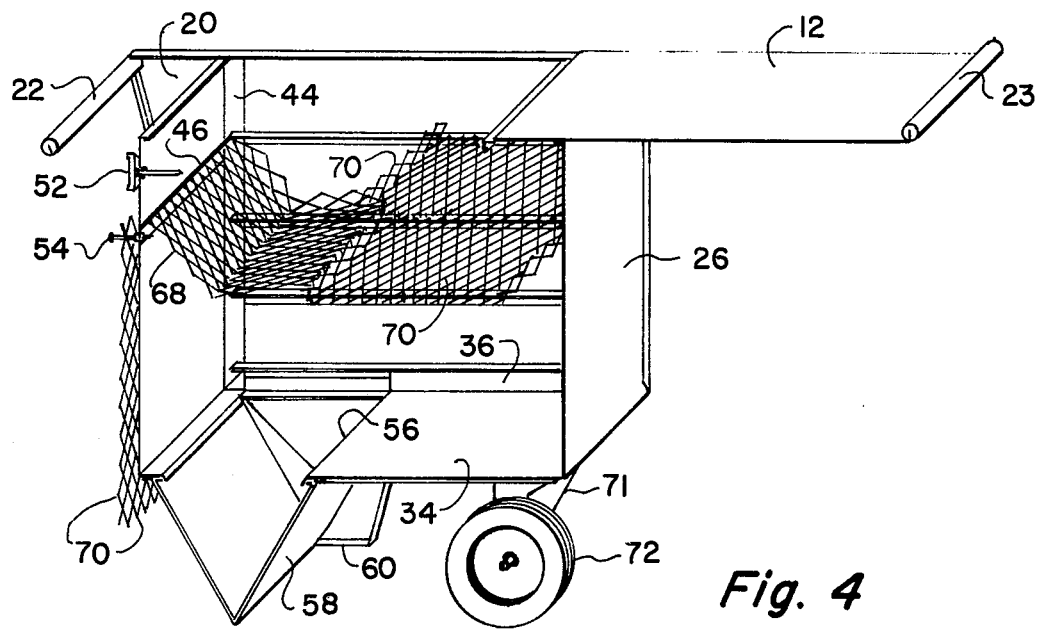
FIG. 4 is a perspective side view similar to FIG. 2 but wherein the charcoal grids and racks are shown rearranged for use as a more conventional grill.

The racks 70 may be moved to the positions shown in FIG. 2 where they are not directly above charcoal on the grid 68. Alternatively, when grilling is desired, the grids can be moved directly over the grid 68. Also, and as shown in FIG. 4, the grid 68 can be supported between the angle 46 and a rack 70 such that the charcoal fire is elevated and grilling can be achieved on the uppermost rack 70 with the charcoal directly beneath it. Since the upper cover 12 is infinitely adjustable, as is the ash drawer 62, a desired temperature can be maintained inside the enclosure by opening each to provide a desired draft to increase temperature or closed to retard or reduce temperature. The bottom panel 34, having flanges 36 at its opposite edges, provides a tray which collects grease and drippings and automatically directs them into the ash drawer 62.

Although the invention has been shown in connection with a certain specific embodiment, it will be readily apparent to those skilled in the art that various changes in form and arrangement of parts may be made to suit requirements without departing from the spirit and scope of the invention. In this respect, it will be apparent that instead of using charcoal as a fuel, alternate fuels (e.g., gas or electric) can be employed equally well.

I claim as my invention:

1. A cooking device comprising a generally rectangular enclosure, an upper sliding cover for said enclosure, an opening in the bottom of the enclosure, means in said opening for burning fuel, a plurality of vertically-spaced guideways extending along opposite sides of said enclosure, and a plurality of cooking racks slideably supported on said guideways and movable from positions where they are directly above said means for burning fuel to positions where they are not above said means for burning, whereby food can be grilled on the cooking racks directly above said means for burning or can be smoked on racks in positions where they are not above said means for burning.

2. The cooking device of claim 1 wherein said means for burning comprises a grid positioned over said opening in the bottom of the enclosure for supporting charcoal thereon.

3. The cooking device of claim 2 including an ash-drawer assembly beneath said charcoal grid and contained by a bottom support housing and its end panel.

4. The cooking device of claim 3 wherein said bottom housing and its end panel supports one end of said enclosure, and including a wheel depending downwardly from the other end of said enclosure to provide a tripod support for the enclosure.

5. The cooking device of claim 3 wherein said ash-drawer assembly comprises a V-shaped housing, and a V-shaped drawer slideable into or out of said housing, the position of said V-shaped drawer controlling the draft passing through charcoal on said grid.

6. The cooking device of claim 3 wherein said enclosure is formed from side panels and front and rear panels, and wherein said side panels are provided with triangularly-shaped extensions at one end of the enclosure which support a handle for mobility.

7. The cooking device of claim 6 wherein said opening and the bottom support housing enclosing said ash-drawer assembly therebeneath is at one end of the enclosure and said handle is above said ash-drawer assembly at said one end of the enclosure, and including a downwardly-depending wheel at the end of said enclosure opposite said opening.

* * * * *